(12) United States Patent
Van Gelderen et al.

(10) Patent No.: US 8,851,505 B2
(45) Date of Patent: Oct. 7, 2014

(54) STROLLER

(71) Applicant: Nuna International B.V., Zuidoost (NL)

(72) Inventors: Martijn Hans Van Gelderen, Amsterdam (NL); Vincent Ten Horn, Zuidoost (NL); Erik Baas, Zuidoost (NL); Thomas van der Schoor, Zuidoost (NL); Maurits Homan, Zuidoost (NL)

(73) Assignee: Nuna International B.V., Amsterdam, Zuidoost (NL)

( * ) Notice: Subject to any disclaimer, the term of this patent is extended or adjusted under 35 U.S.C. 154(b) by 0 days.

(21) Appl. No.: 13/961,548

(22) Filed: Aug. 7, 2013

(65) Prior Publication Data

US 2014/0042729 A1 Feb. 13, 2014

Related U.S. Application Data

(63) Continuation of application No. 12/832,762, filed on Jul. 8, 2010, now abandoned.

(60) Provisional application No. 61/270,616, filed on Jul. 10, 2009.

(51) Int. Cl.
*B62B 1/00* (2006.01)
*B62B 7/14* (2006.01)
*B62B 9/28* (2006.01)

(52) U.S. Cl.
CPC . *B62B 7/14* (2013.01); *B62B 7/142* (2013.01); *B62B 7/145* (2013.01); *B62B 9/28* (2013.01)
USPC .......................................... 280/658; 280/657

(58) Field of Classification Search
USPC .............. 280/33.993, 47.38, 639–658, 47.41; 297/195.13, 218.1
See application file for complete search history.

(56) References Cited

U.S. PATENT DOCUMENTS

| | | | |
|---|---|---|---|
| 5,773,379 A | 6/1998 | Bonifay et al. | |
| 5,947,555 A | 9/1999 | Welsh et al. | |
| 6,286,844 B1 | 9/2001 | Cone et al. | |
| 6,893,040 B2 | 5/2005 | Hou et al. | |
| 7,032,922 B1 | 4/2006 | Lan | |
| 7,267,359 B1 | 9/2007 | Yang et al. | |
| 7,475,900 B2 * | 1/2009 | Cheng | 280/642 |
| 7,658,399 B2 | 2/2010 | Van Dijk | |
| 7,681,894 B2 | 3/2010 | Santamaria | |

(Continued)

FOREIGN PATENT DOCUMENTS

| | | |
|---|---|---|
| CN | 2841448 | 11/2006 |
| CN | 201201629 Y | 3/2009 |

*Primary Examiner* — John Walters
*Assistant Examiner* — James Triggs
(74) *Attorney, Agent, or Firm* — Banner & Witcoff, Ltd.

(57) ABSTRACT

A stroller includes a stroller frame having two opposite side frames, two first connecting devices disposed respectively on the two side frames of the stroller frame, a first removable seat including a seat body and two second connecting devices disposed respectively on two sides of the seat body of the first removable seat, a second removable seat including a seat body, and two third connecting devices disposed respectively on two sides of the seat body of the second removable seat. The first connecting devices are selectively and respectively connected with the second connecting devices or the third connecting devices so as to selectively mount the first removable seat or the second removable seat to the stroller frame.

21 Claims, 13 Drawing Sheets

(56) References Cited

U.S. PATENT DOCUMENTS

| | | |
|---|---|---|
| D621,306 S | 8/2010 | Liao |
| 7,766,366 B2 | 8/2010 | Li |
| 7,938,435 B2 | 5/2011 | Sousa et al. |
| 8,033,555 B2 | 10/2011 | Mostert et al. |
| 2008/0231022 A1 | 9/2008 | Hu et al. |

* cited by examiner

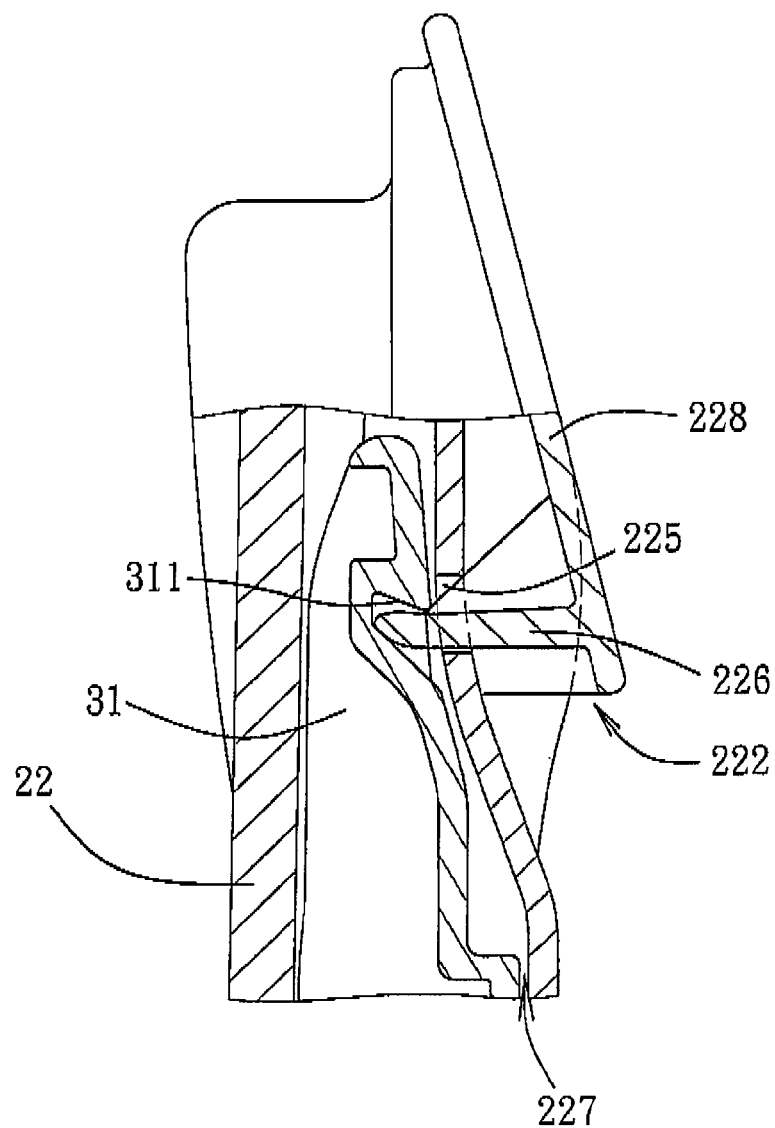
F I G. 7

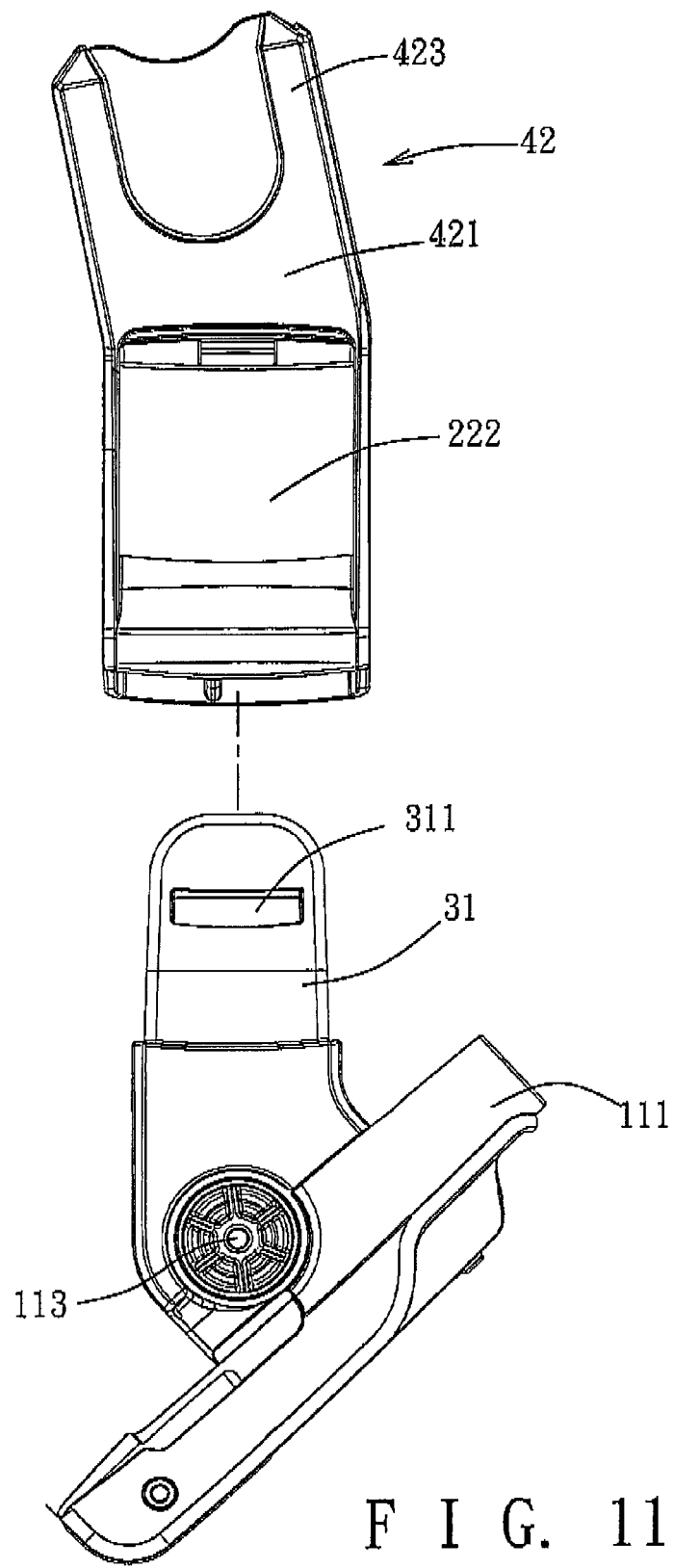
F I G. 11

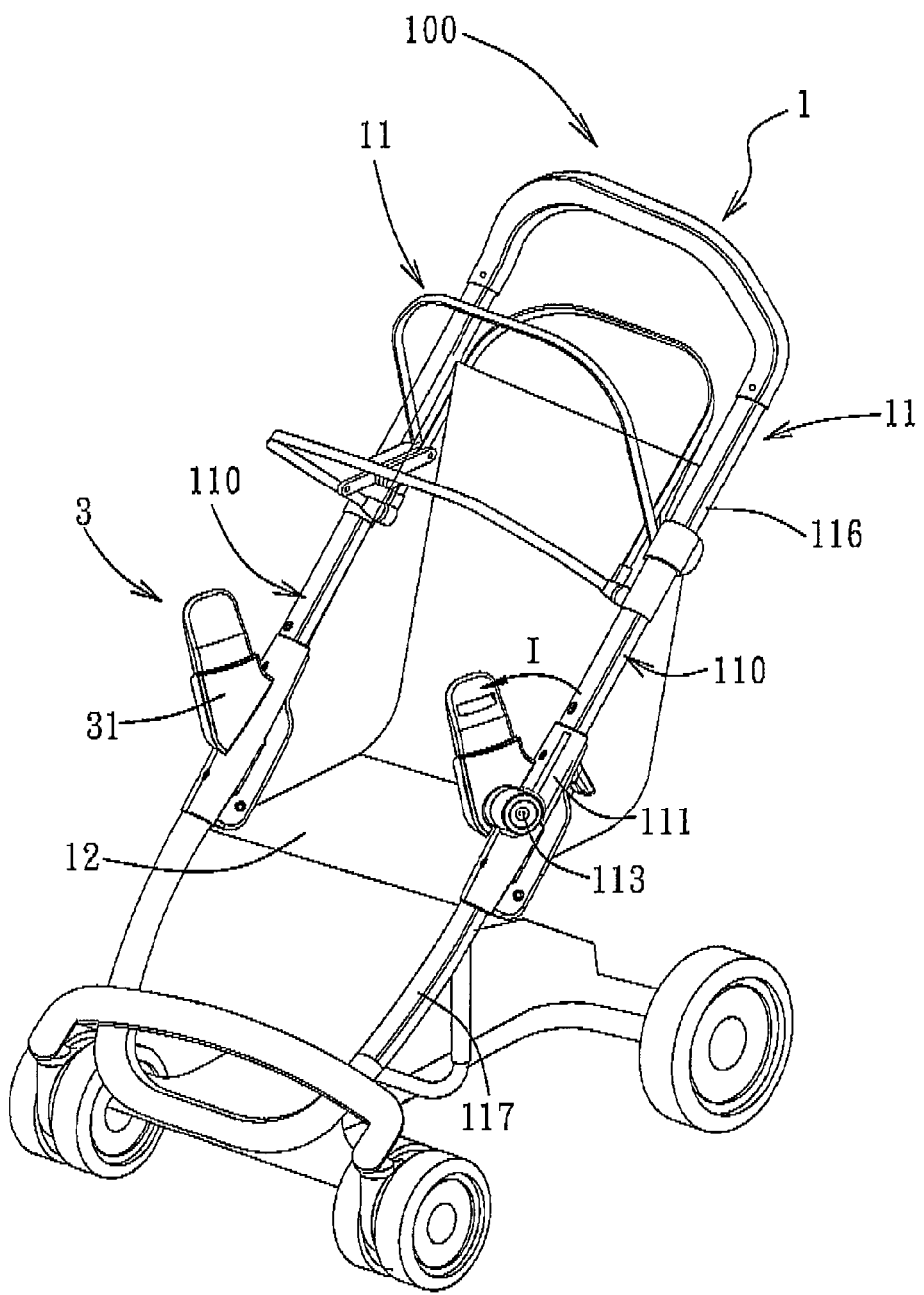
F I G. 12

STROLLER

CROSS-REFERENCE TO RELATED APPLICATION

This application is a continuation application of U.S. application Ser. No. 12/832,762 filed on Jul. 8, 2010, which claims priprity of U.S. Application No. 61/270,616 filed on Jul. 10, 2009 which are incorporated by reference herein in its entirety.

BACKGROUND OF THE INVENTION

1. Field of the Invention

The invention relates to a stroller, more particularly to a stroller that can provide a combination of different forms of baby chairs.

2. Description of the Related Art

To carry a baby along for an outdoor activity, the baby is put in a baby stroller, a carry cot, or a car safety seat. Depending on the situation, the baby is usually transferred from an original transporting device to another transporting device. For example, when arriving at a destination, the baby is removed from a car safety seat, and is transferred to a stroller. Since a baby stroller having a combination of different kinds of seats is not provided currently in the market, the baby in the carrycot or car safety seat must be carefully transferred from the original transporting device to the stroller. Transferring of the baby from the original transporting device to the stroller is not only laborious, but the baby may get injured or experience discomfort when the action is rough. Hence, if the carry cot or the car safety seat could be directly installed on the stroller, there would be no need to transfer the baby from one transporting device to another, thereby facilitating carrying of the baby outdoors.

SUMMARY OF THE INVENTION

Therefore, an object of the present invention is to provide a stroller that can selectively install a car safety seat or a carry cot thereto.

According to one aspect of this invention, a stroller comprises a stroller frame including two opposite side frames, two first connecting devices disposed respectively on the two side frames of the stroller frame, a first removable seat including a seat body and two second connecting devices disposed respectively on two sides of the seat body of the first removable seat, a second removable seat including a seat body, and two third connecting devices capable of coupling respectively with two sides of the seat body of the second removable seat. The first connecting devices are selectively and respectively connected with the second connecting devices or the third connecting devices so as to selectively mount the first removable seat or the second removable seat to the stroller frame.

According to another aspect of this invention, a stroller comprises a stroller frame including two symmetrical side frames, two first connecting devices disposed removably and respectively on the side frames of the stroller frame, and a removable seat including a seat body and two second connecting devices respectively disposed on two sides of the seat body and releasably and respectively locked on the first connecting devices.

According to a further aspect of the present invention, a stroller comprises a stroller frame including two opposite side frames, two supporting mechanisms disposed respectively on the two side frames of the stroller frame, and first and second removable seats. Each of the supporting mechanisms is convertible between a first used state and a second used state, so that the supporting mechanisms are selectively connected to one of the first and second removable seats to thereby mount a selected one of the first and second removable seats on the stroller frame.

BRIEF DESCRIPTION OF THE DRAWINGS

Other features and advantages of the present invention will become apparent in the following detailed description of the preferred embodiments with reference to the accompanying drawings, of which:

FIG. 7 is a sectional view of the first preferred embodiment, illustrating how the first and second connecting devices can be interconnected;

FIG. 11 illustrates how a third connecting device can be connected to the first connecting device;

FIG. 12 is a perspective view of the stroller of the first preferred embodiment.

DETAILED DESCRIPTION OF THE PREFERRED EMBODIMENTS

Figure 1:
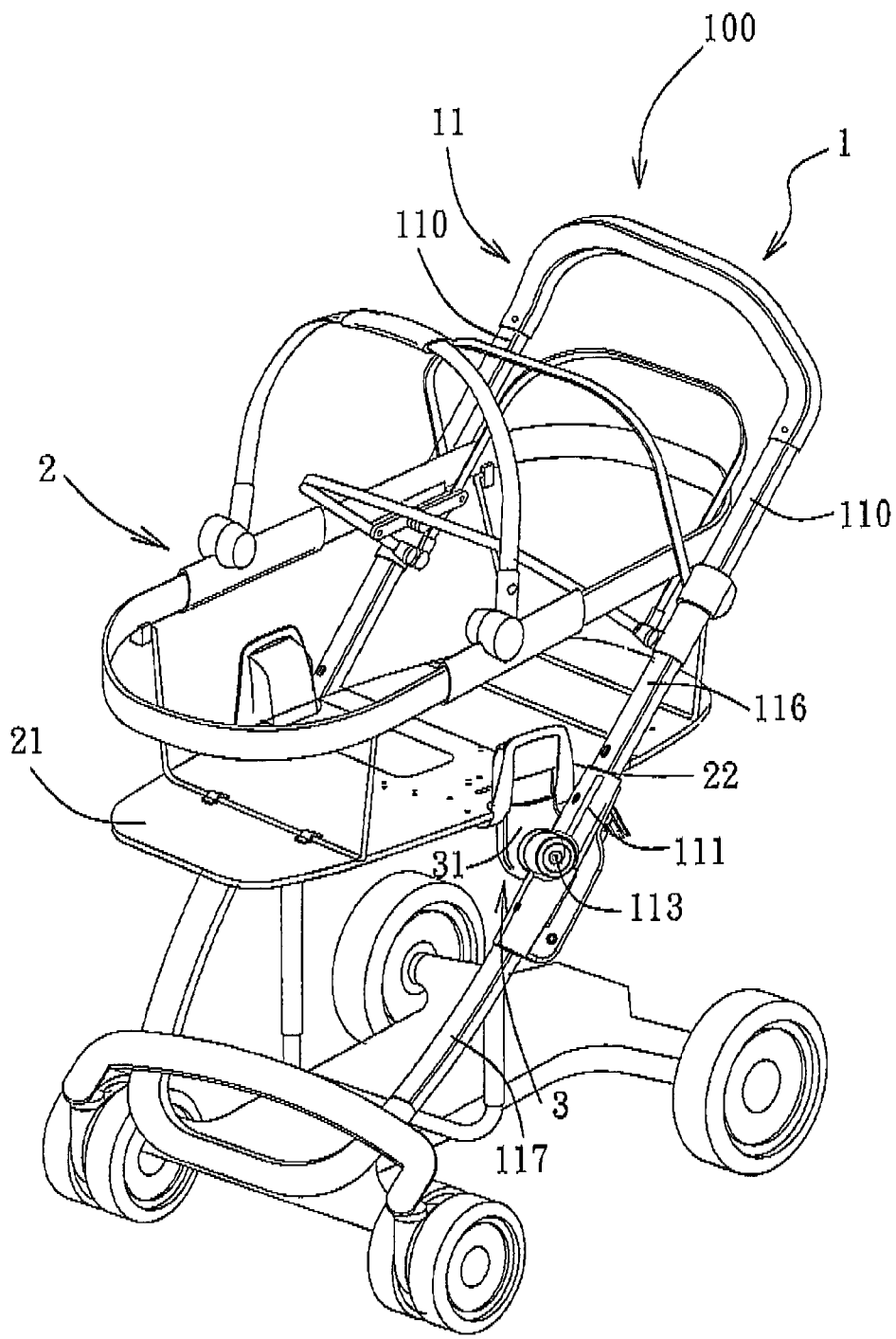
FIG. 1 is a perspective view of a stroller according to the first preferred embodiment of the present invention, illustrating a first removable seat assembled on a stroller frame of the stroller.

The above-mentioned and other technical contents, features, and effects of this invention will be clearly presented from the following detailed description of two preferred embodiments in coordination with the reference drawings.

Before this invention is described in detail, it should be noted that, in the following description, similar elements are designated by the same reference numerals.

Referring to FIGS. 1 to 12, a stroller 100 of the present invention permits a stroller frame 1 thereof to be selectively installed with a carry cot or a car safety seat, so that there is no need to transfer a baby from the carry cot or the car safety seat to the stroller 100. Instead, the baby along with the carry cot or the car safety seat can be directly disposed on the stroller 100.

The stroller 100 according to the first preferred embodiment of the present invention comprises the stroller frame 1, a stroller seat 12 (see FIG. 12) disposed removably on the stroller frame 1, a first removable seat 2, a second removable seat 4, and two first connecting devices 3.

Figure 2:
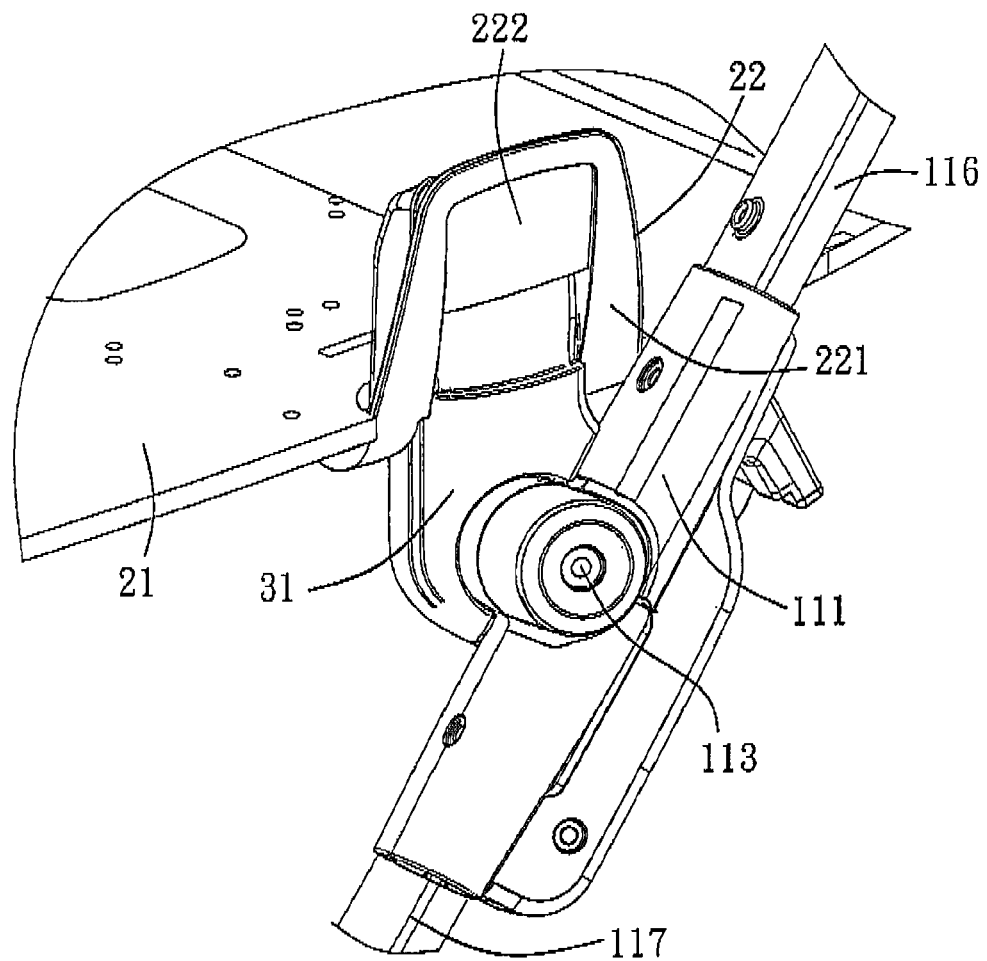
FIG. 2 is a fragmentary enlarged perspective view of the first preferred embodiment, illustrating how first and second connecting devices are interconnected.
Figure 4:
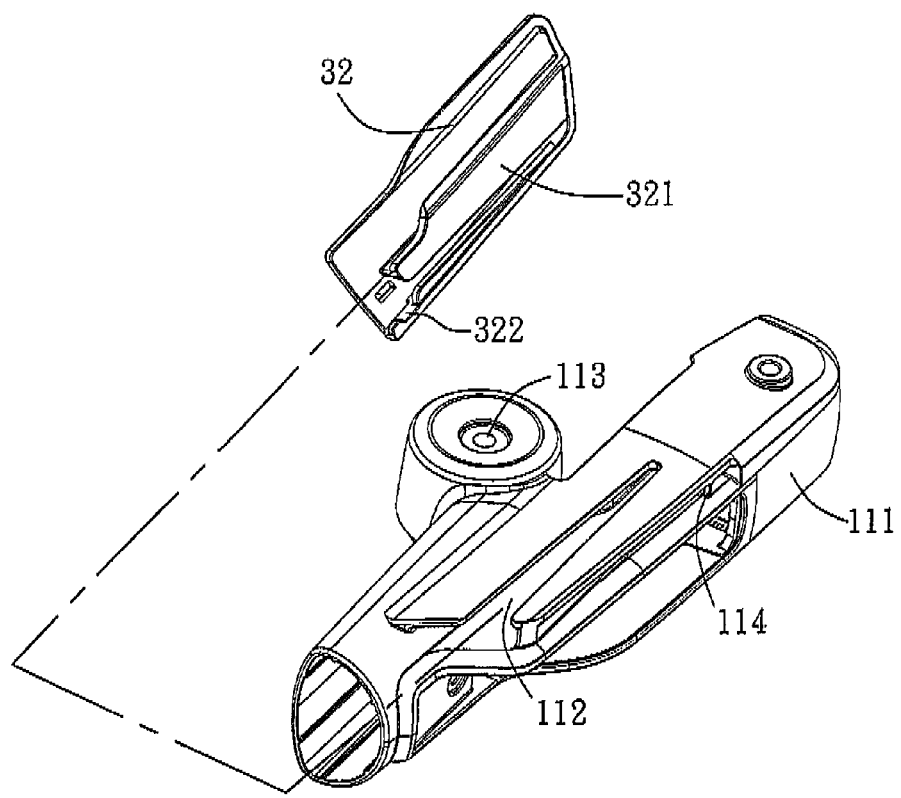
FIG. 4 illustrates how a connecting member of the first connecting device can be connected to a mounting seat of the stroller frame.

The stroller frame 1 includes two symmetrical side frames 11 each of which has a side rod 110, and a mounting seat 111 disposed on the side rod 110 and including a pivot knuckle 113. The side rod 110 includes an upper rod portion 116 and a lower rod portion 117 connected pivotally to each other through the pivot knuckle 113. When the stroller 100 is to be folded, the upper rod portion 116 rotates in a counterclockwise direction (I) (see FIG. 12), and pivots toward the lower rod portion 117 via the pivot knuckle 113. With reference to FIGS. 2 and 4, the mounting seat 111 further includes a first connecting portion 112 on a sidewall thereof, and a first positioning portion 114 (see FIG. 4) disposed in proximity to the first connecting portion 112.

Figure 3:
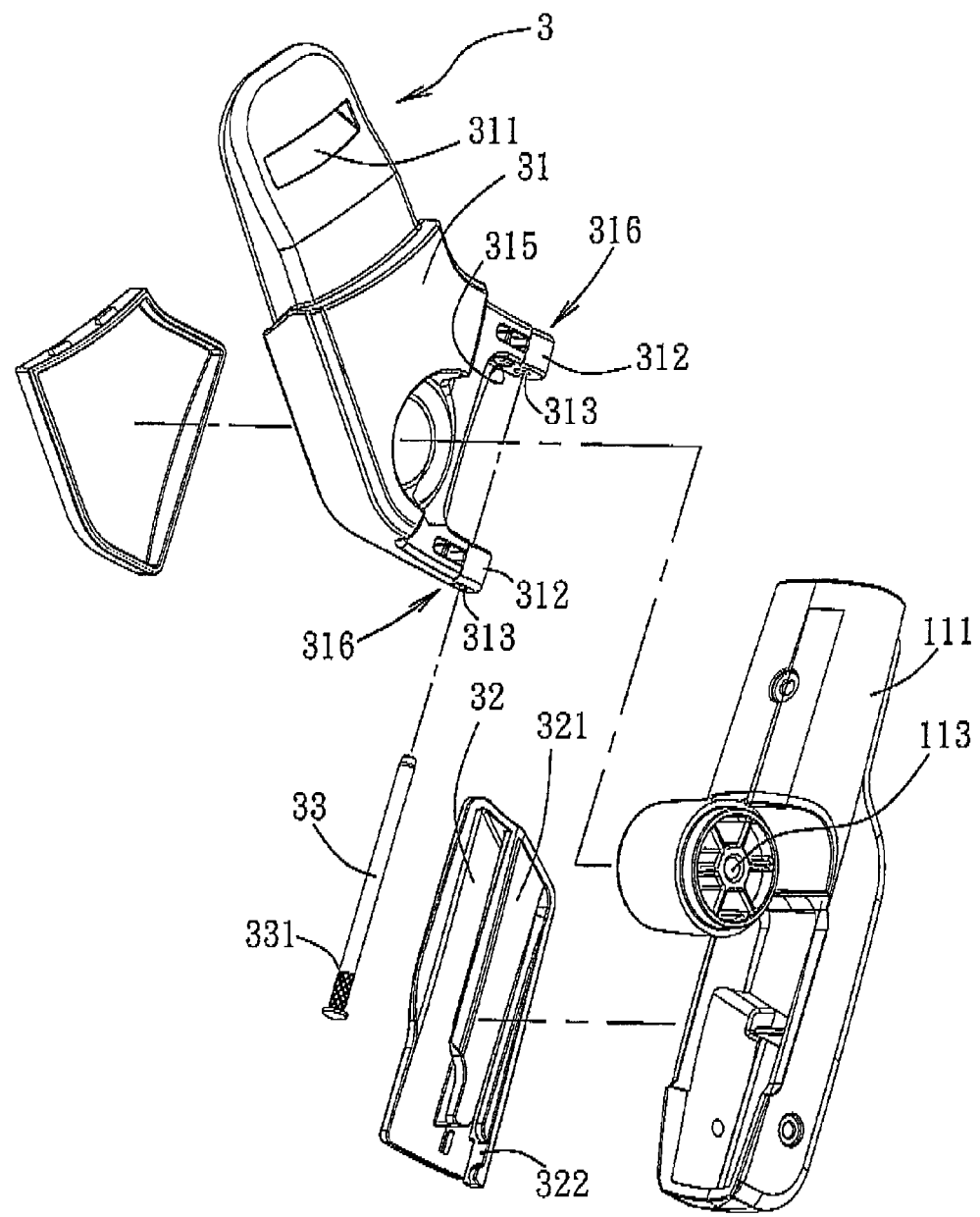
FIG. 3 is an exploded perspective view of the first connecting device of the first preferred embodiment.
Figure 9:
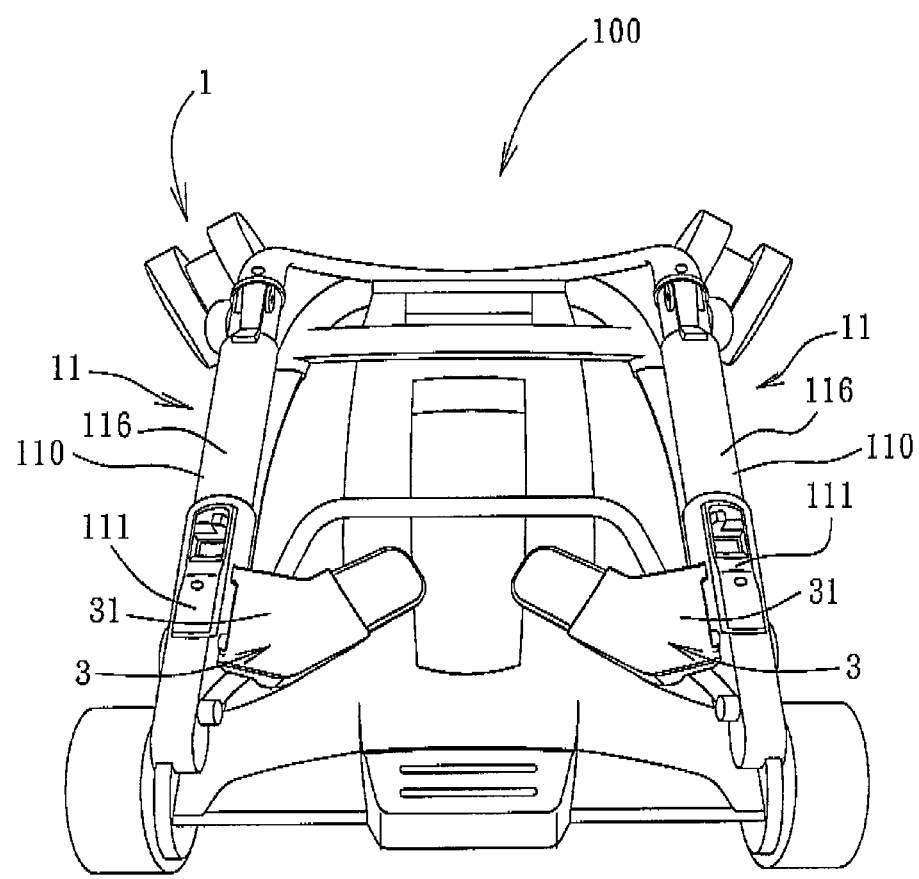
FIG. 9 is a perspective view of the first preferred embodiment, illustrating the stroller frame in a folded state.

The first connecting devices 3, as shown in FIG. 9, are connected respectively and removably to the mounting seats 111 on the two side frames 11 of the stroller frame 1. With reference to FIG. 3, each first connecting device 3 includes a retaining member 31, and a connecting member 32 connected pivotally to the retaining member 31.

With reference to FIGS. 3 and 4, the connecting member 32 is connected releasably to the mounting seat 111. In an alternative embodiment, the connecting member 32 may be connected fixedly to the mounting seat 111. One side surface of the connecting member 32 includes a second connecting portion 321 connected slidably and removably to the first connecting portion 112. In this embodiment, the first connecting portion 112 is configured as a slide slot, and the second connecting portion 321 is configured as a T-shaped projection. Alternatively, the first connecting portion 112 may be configured as a T-shaped projection, and the second connecting portion 321 may be configured as a slide slot. Both configurations can achieve a similar effect. The side surface of the connecting member 32 further includes a second positioning portion 322 corresponding in position to the first positioning portion 114. When each first connecting device 3 is assembled to the mounting seat 111 on the respective side frame 11 of the stroller frame 1, the second connecting portion 321 is inserted slidably into the first connecting portion 112, and the first positioning portion 114 is engaged to the second positioning portion 322, thereby fixing the connecting member 32 to and preventing the same from moving away from the mounting seat 111. In this embodiment, the first positioning portion 114 is configured as a rib, and the second positioning portion 322 is configured as a notch to engage the rib. Alternatively, the first positioning portion 114 may be configured as a notch, and the second positioning portion 322 may be configured as a rib to engage the notch. Both configurations can achieve a similar effect.

Figure 5:
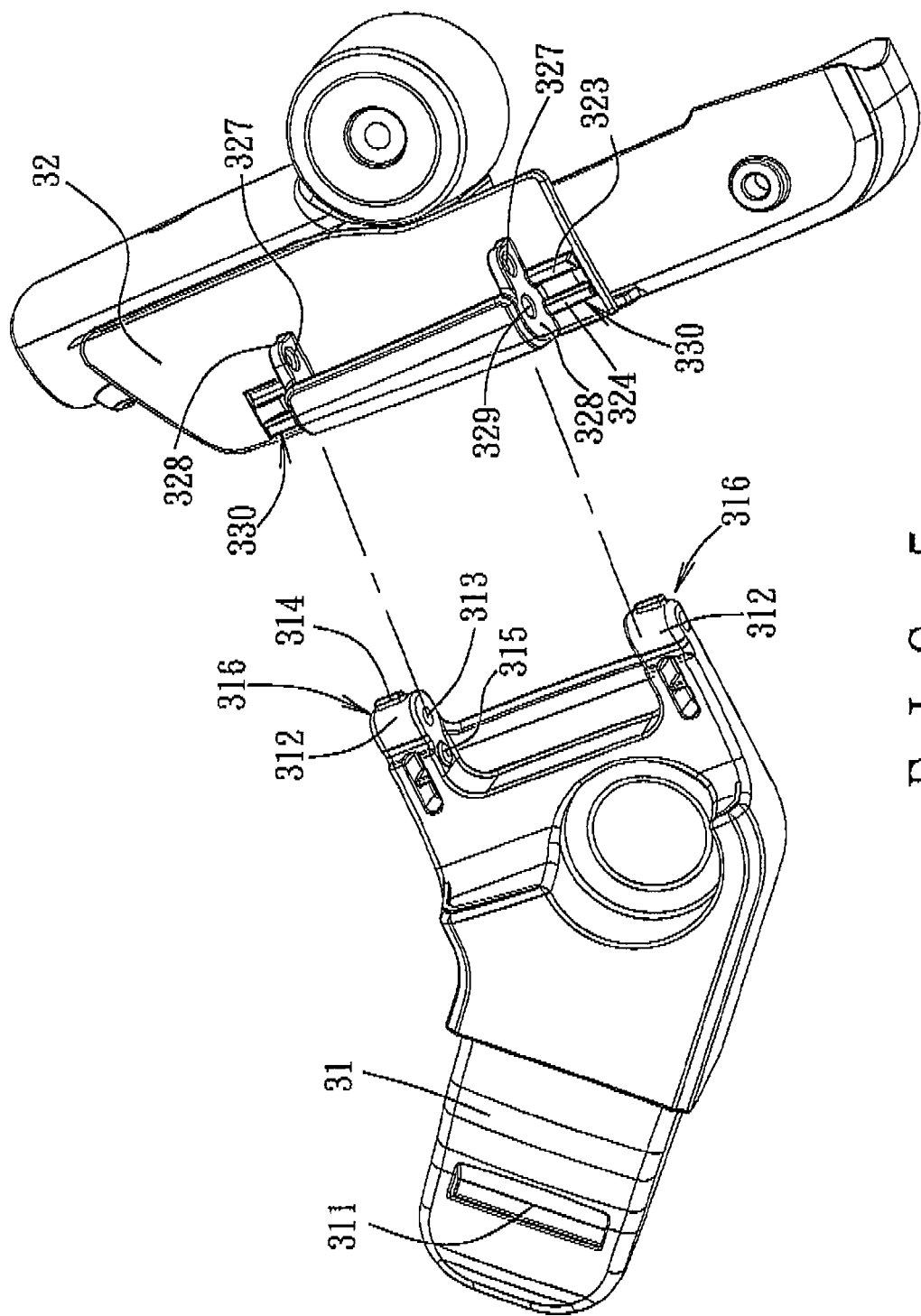
FIG. 5 illustrates how a retaining member can be connected to the connecting member.

The other opposite side of the connecting member 32, as shown in FIG. 5, includes two spaced-apart first pivot portions 328 for pivot connection with the retaining member 31, and two fixing portions 330 for positioning the retaining member 31. In this embodiment, the first pivot portions 328 project toward the retaining member 31, and are respectively formed with a pivot hole 329. Each fixing portion 330 includes a pair of upper ribs 323 and a pair of lower ribs 324, and a positioning hole 327 formed in the respective first pivot portion 328 in proximity to the pivot hole 329.

With reference to FIGS. 3 and 5, the retaining member 31 includes a second engaging portion 311 proximate to a top end thereof, and a second pivot portion 316 disposed opposite to the second engaging portion 311. In this embodiment, the second pivot portion 316 includes a pivot pin 33, and two side arms 312 extending downwardly and respectively from two opposite sides of a bottom end of the retaining member 31. Each side arm 312 has an insert hole 313, a limiting protrusion 314 projecting from a bottom end thereof, and a boss 315 projecting inwardly from an inner side thereof above the insert hole 313. The pivot pin 33 extends through the insert holes 313 in the side arms 312 and the pivot holes 329 in the first pivot portions 328 so as to connect pivotally the retaining member 31 to the connecting member 32. The pivot pin 33 is formed with knurls on an outer surface thereof so as to fit tightly in and prevent removal from the insert holes 313. When use of the retaining member 31 is required, the retaining member 31 is pivoted upwardly relative to the connecting member 32 so as to project upwardly to a used state for connection with the first removable seat 2, which will be described hereinafter with reference to FIG. 6. At the used state, the bosses 315 are engaged to the respective positioning holes 327 to lock the retaining member 31. To shift the retaining member 31 from the used state to an unused state, the retaining member 31 is pivoted downwardly and inwardly about the pivot pin 33 relative to the mounting seat 111 and the connecting member 32 (see FIG. 8). At the unused state, each limiting protrusion 314 is engaged between the upper and lower ribs 323, 324 to maintain the retaining member 31. With reference to FIG. 9, the stroller frame 1 is in a folded state, and the retaining members 31 of the first connecting devices 3 are in the unused state. In the unused state, the retaining members 31 are substantially in the same plane as the side rods 110, and extend inwardly toward each other, so that the volume of the stroller 100 when folded is small.

With reference to FIGS. 1, 2, 6, and 7, the first removable seat 2 can be assembled detachably to the stroller frame 1, and includes a seat body 21, and two second connecting devices 22 disposed respectively on two opposite sides of the seat body 21. In this embodiment, the first removable seat 2 is configured as a carry cot. Each second connecting device 22 includes a sleeve member 221, a locking member 222, and a torsion spring 224. The sleeve members 221 of the second connecting devices 22 are fixed respectively to the two opposite sides of the seat body 21. Each sleeve member 221 has a receiving space 227 that opens downwardly for receiving the retaining member 31, and a through hole 225 communicating spatially with the receiving space 227. When the retaining member 31 is inserted into the receiving space 227 (see FIGS. 6 and 7), the through hole 225 and the second engaging portion 311 are aligned with each other. The locking member 222 includes a locking body 228, an insert pin 223, and a first engaging portion 226 projecting from an inner side of the locking body 228. One end of the locking body 228 is connected pivotally to the sleeve member 221 through the insert pin 223. The torsion spring 224 is sleeved on the insert pin 223, and is disposed between the locking body 228 and the sleeve member 221 to bias the locking member 222 to move toward the sleeve member 221.

Figure 6:
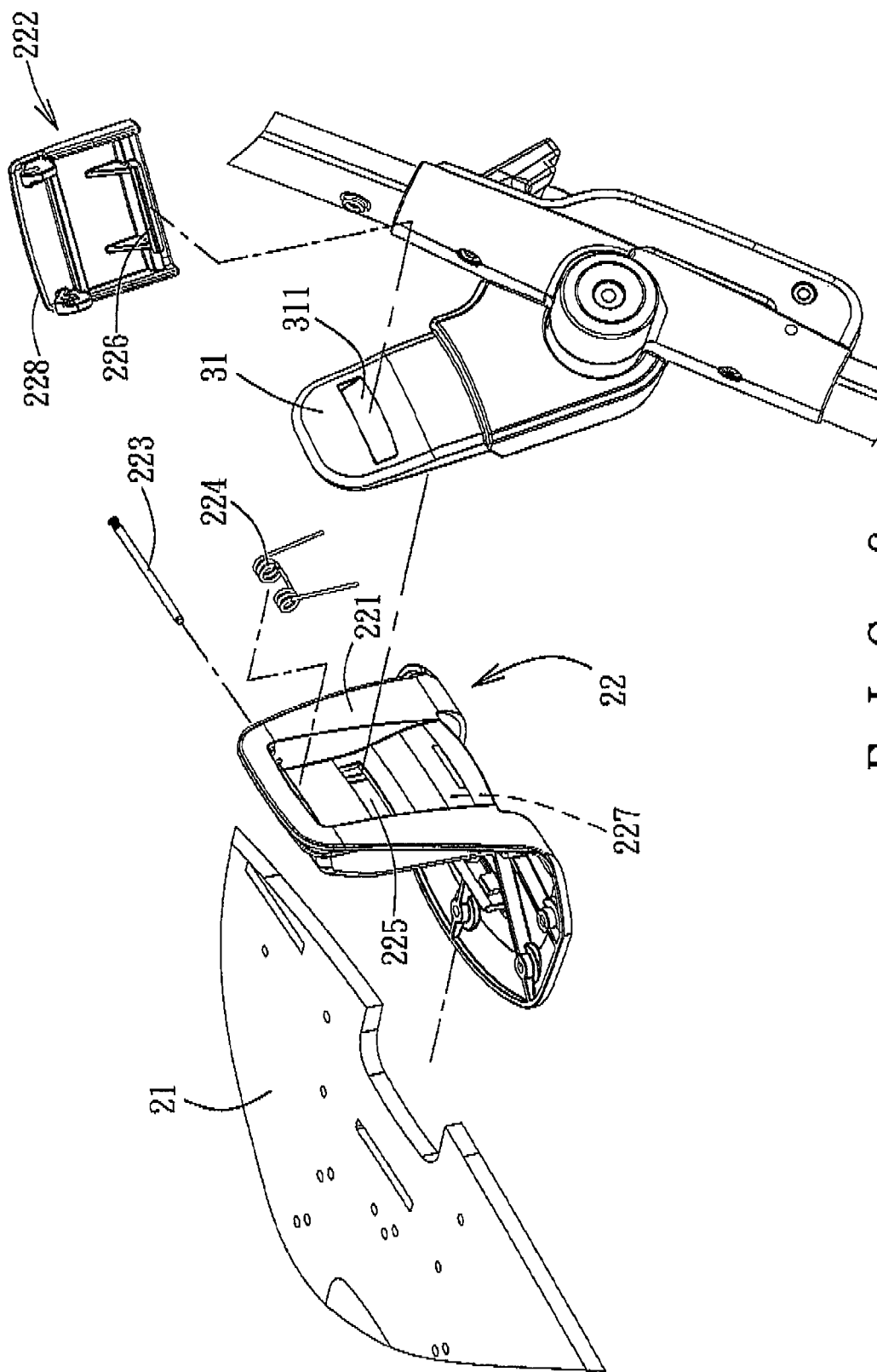
FIG. 6 is an exploded perspective view of a second connecting device of the first preferred embodiment.
Figure 8:
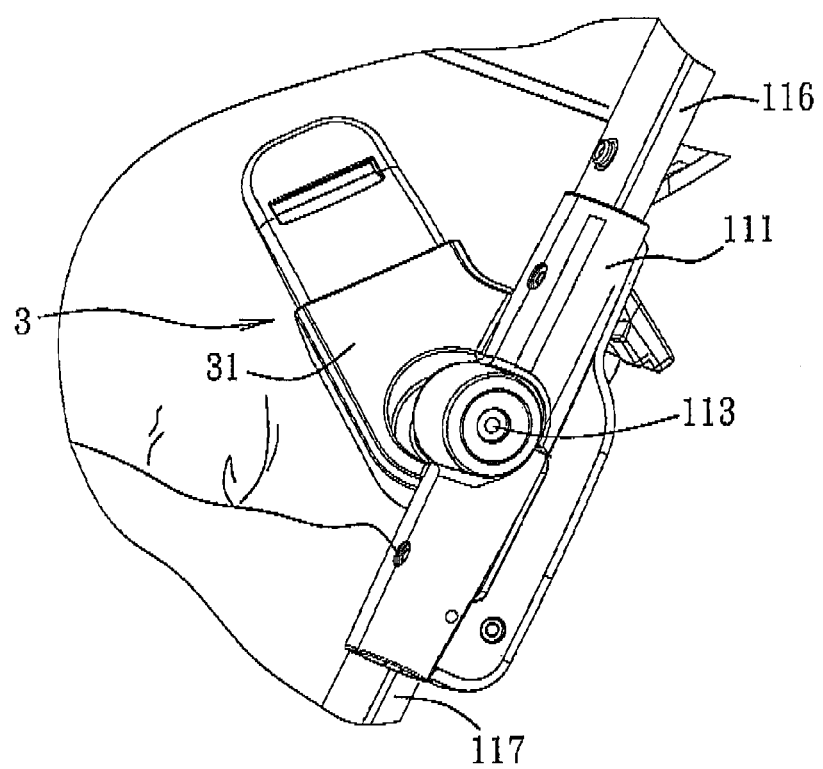
FIG. 8 illustrates the first connecting device in an unused state.

If it is desired to assemble the first removable seat 2 to the stroller frame 1, each first connecting device 3 is first connected to the mounting seat 111 on the respective side frame 11 of the stroller frame 1 by inserting the second connecting portion 321 into the first connecting portion 112 and engaging the second positioning portion 322 with the first positioning portion 114, after which the retaining member 31 of each first connecting device 3 is pivoted to project upwardly to the used state, as shown in FIGS. 1 and 6. At this time, the bosses 315 of the retaining member 31 are engaged respectively to the positioning holes 327, and maintain the retaining member 31 at the used state. The sleeve member 221 of each second connecting device 22 is then sleeved on the retaining member 31 of the respective first connecting device 3. The first engaging portion 226 of the locking member 222 extends through the through hole 225, and engages with the second engaging portion 311, as shown in FIG. 7, thereby locking each second connecting device 22 to the respective first connecting device 3. Hence, the baby (not shown) in the first removable seat 2 can be transferred along with the first removable seat 2 to the stroller 100 without removing the baby from the first removable seat 2. When the locking member 222 is operated so as to move the first engaging portion 226 away from the sleeve member 221 and the second engaging portion 311, each second connecting device 22 can be disconnected from the respective first connecting device 3, so that the first removable seat 2 can be removed from the stroller frame 1. The first removable seat 2 is removed from the stroller 100 so as to facilitate carrying of the same by the user to a place where the stroller 100 is not required. A bottom portion of the sleeve member 221 is flat, so that the first removable seat 2 will not rock or is prevented from damaging a supporting surface when placed on the ground or on the supporting surface (for example, a table or a chair).

Figure 10:
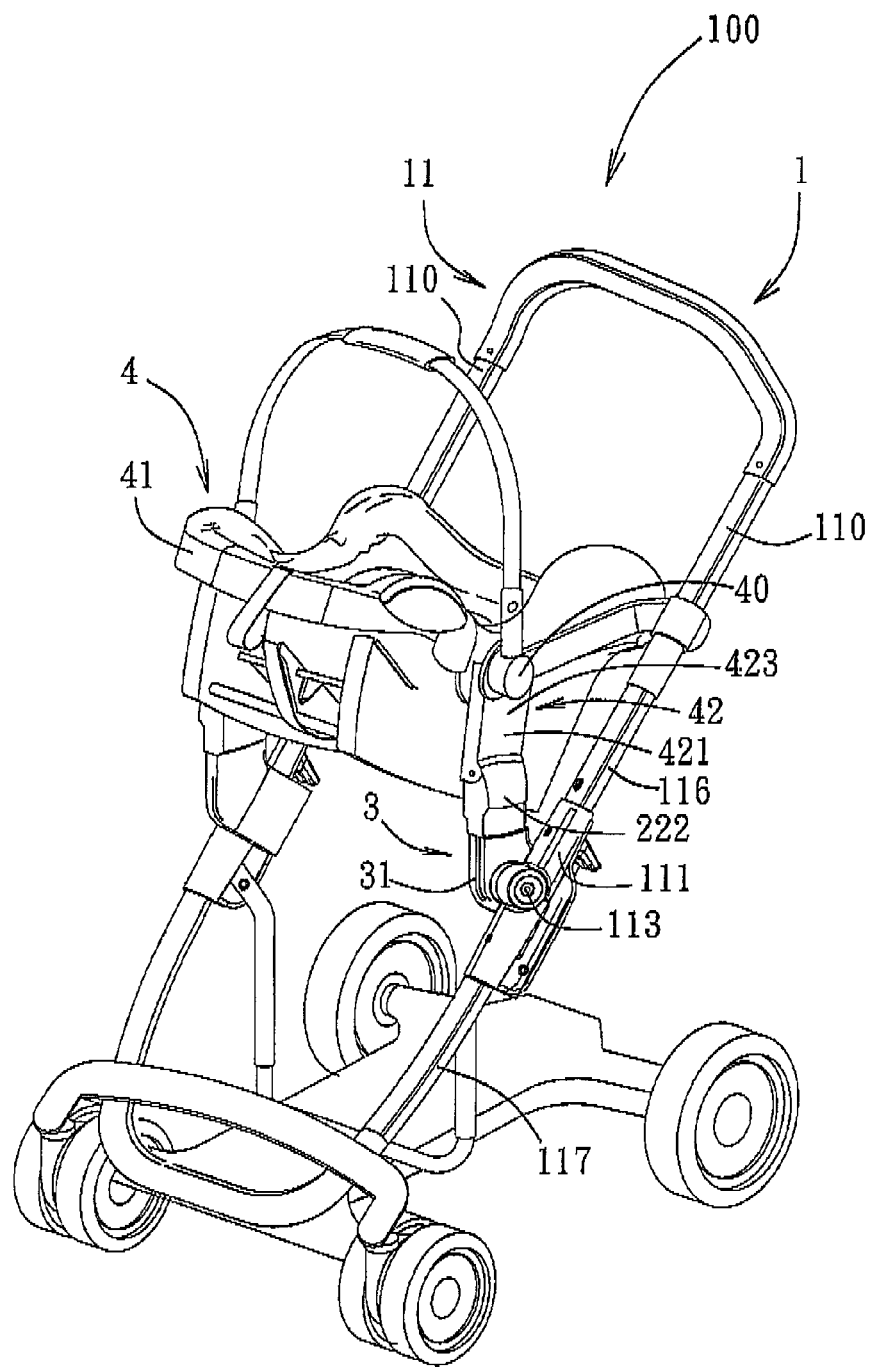
FIG. 10 illustrates a second removable seat assembled on the stroller frame.

With reference to FIG. 10, the second removable seat 4 is shown as being assembled to the stroller frame 1. The second removable seat 4 includes a seat body 41. Two third connecting devices 42 are disposed respectively on two opposite sides of the seat body 41, and are connected respectively to the first connecting devices 3 so as to assemble the second removable seat 4 to the stroller frame 1. In this embodiment, the second removable seat 4 is configured as a car safety seat. The structure of the third connecting device 42 is generally similar to that of the second connecting device 22. Particularly, the third connecting device 42 includes a sleeve member 421 and the locking member 222. The difference between the second and third connecting devices 22, 42 resides in the configuration of the sleeve member 421. The sleeve member 421 of the third connecting device 42 has a connecting portion 423 for connection with the seat body 41 of the second removable seat 4. The assembly relation of the components of the third connecting device 42 is similar to that of the second connecting device 22, so that a detailed description of the third connecting device 42 is dispensed herewith.

If it is desired to assemble the second removable seat 4 to the stroller frame 1, each first connecting device 3 is first connected to the mounting seat 111 on the respective side frame 11 of the stroller frame 1, and each third connecting device 42 is connected to the respective first connecting device 3. At this time, the second removable seat 4 is connected detachably to the stroller frame 1 through the connecting portions 423 of the third connecting devices 42. The connecting portion 423 of each third connecting device 42 engages with a pivot part 40 of a handle of the second removable seat 4. Hence, the second removable seat 4 can be directly transferred from a car to the stroller frame 1, and there is no need to move the baby (not shown) in the second removable seat 4.

Therefore, the user can selectively assemble the first or second removable seat 2, 4 to the stroller frame 1 of the stroller 100 of the present invention according to his or her requirement by using the second or third connecting devices 22, 42 in combination with the first connecting devices 3.

Figure 13:
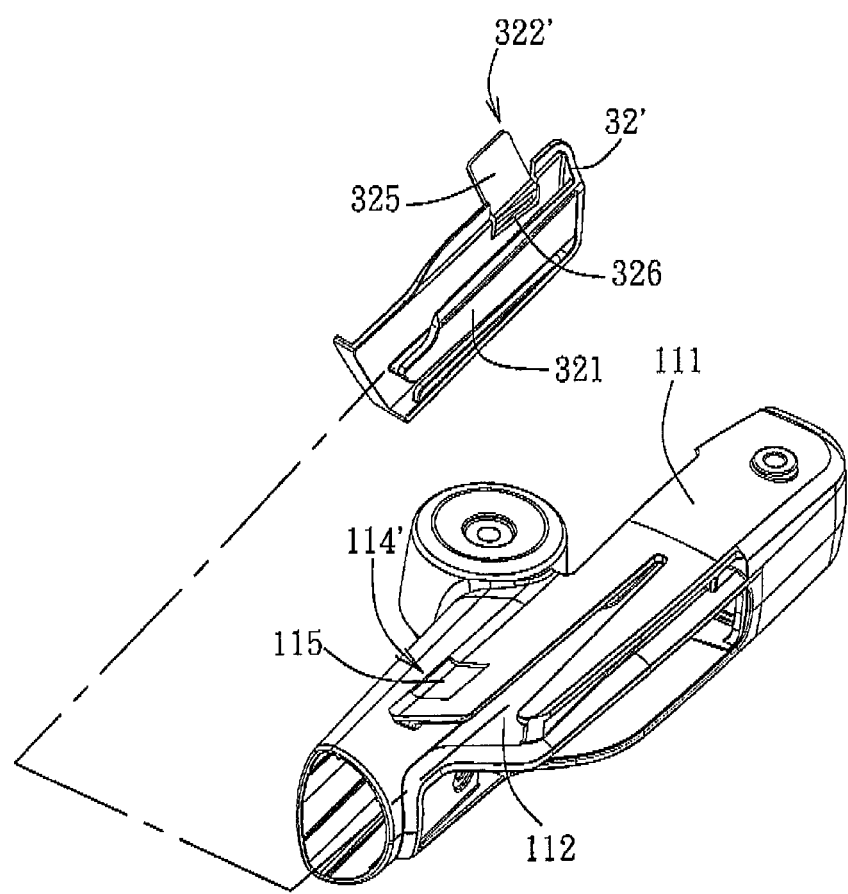
FIG. 13 is a perspective view of a connecting member and amounting seat of a stroller according to the second preferred embodiment of the present invention.

FIG. 13 illustrates a mounting seat 111 and a connecting member 32' of a stroller 100 (see FIG. 1) according to the second preferred embodiment of the present invention. Unlike the embodiment shown in FIG. 4, the first positioning portion 114' of the mounting seat 111 in this embodiment is disposed in proximity to a front end of the first connecting portion 112, and includes an engaging hole 115. The second positioning portion 322' of the connecting member 32' has a lever portion 325 inclining with respect to the other side surface thereof. The lever portion 325 has an engaging rib 326 formed on a bottom end thereof in proximity to the second connecting portion 321. When the second connecting portion 321 is connected to the first connecting portion 112, the engaging rib 326 can engage with the engaging hole 115 so as to prevent removal of the connecting member 32 from the mounting seat 111. By pulling the lever portion 325 away from the mounting seat 111 can release engagement of the engaging rib 326 from the engaging hole 115, thereby removing the connecting member 32 from the mounting seat 111. At this time, the first connecting device 3 can be moved away from the mounting seat 111.

From the aforesaid description, the stroller 100 of the present invention can selectively install the first or second removable seat 2, 4 thereto, thereby saving the trouble of moving the baby from different seats. When the baby grows up and does not need the carry cot or the car safety seat, the first connecting device 3 can be removed from the mounting seat 111. Hence, the object of the present invention can be realized.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A stroller comprising:
a stroller frame including two opposite side frames;
two first connecting devices removably and respectively connected to said two side frames of said stroller frame;
a first removable seat including a seat body and two second connecting devices disposed respectively on two sides of said seat body of said first removable seat;
a second removable seat including a seat body; and
two third connecting devices capable of coupling respectively with two sides of said seat body of said second removable seat, said third connecting devices being separable from said second removable seat;
wherein said first connecting devices are selectively and respectively connected with said second connecting devices or said third connecting devices so as to selectively mount said first removable seat or said second removable seat to said stroller frame; and
wherein each of said side frames of said stroller frame includes a mounting seat having a first connecting portion, and each of said first connecting devices has a second connecting portion connected slidably and removably to said first connecting portion of said mounting seat of a corresponding one of said side frames of said stroller frame.

2. The stroller as claimed in claim 1, wherein one of said first and second connecting portions is configured as a slide slot, and the other one of said first and second connecting portions is configured as a projection to be inserted slidably into said slide slot.

3. The stroller as claimed in claim 1, wherein each of said side frames of said stroller frame has a first positioning portion, each of said first connecting devices including a second positioning portion engaging said first positioning portion so that each of said first connecting devices is positioned to a corresponding one of said side frames of said stroller frame.

4. A stroller comprising:
a stroller frame including two opposite side frames;
two first connecting devices disposed respectively on said two side frames of said stroller frame;

a first removable seat including a seat body and two second connecting devices disposed respectively on two sides of said seat body of said first removable seat;
a second removable seat including a seat body; and
two third connecting devices capable of coupling respectively with two sides of said seat body of said second removable seat, said third connecting devices being separable from said second removable seat;
wherein said first connecting devices are selectively and respectively connected with said connecting devices or said third connecting devices so as to selectively mount said first removable seat or said second removable seat to said stroller frame; and
wherein each of said first connecting devices includes a connecting member disposed on a corresponding one of said side frames of said stroller frame, and a retaining member connected to said connecting member and convertible between a used state and an unused state, said retaining member in said used state projecting upwardly from said connecting member to selectively connect with one of said second connecting devices and said third connecting devices.

5. The stroller as claimed in claim 4, wherein said connecting member and said retaining member of each of said first connecting devices are connected pivotally to each other so that said retaining member is pivotal relative to said connecting member to be convertible between said used and unused states.

6. A stroller comprising:
a stroller frame including two opposite side frames;
two first connecting devices disposed respectively on said two side frames of said stroller frame;
a first removable seat including a seat body and two second connecting devices disposed respectively on two sides of said seat body of said first removable seat;
a second removable seat including a seat body; and
two third connecting devices capable of coupling respectively with two sides of said seat body of said second removable seat, said third connecting devices being separable from said second removable seat;
wherein said first connecting devices are selectively and respectively connected with said second connecting devices or said third connecting devices so as to selectively mount said first removable seat or said second removable seat to said stroller frame; and
wherein each of said first connecting devices includes a connecting member disposed on a corresponding one of said side frames of said stroller frame, and a retaining member connected to said connecting member, each of said second and third connecting devices including a sleeve member and a locking member connected to said sleeve member and operable for locking a corresponding one of said second and third connecting devices to the corresponding said first connecting devices when said sleeve member is sleeved on said retaining member of the corresponding one of said first connecting devices.

7. The stroller as claimed in claim 1, wherein said mounting seat of each of said side frames of said stroller frame further has a pivot knuckle configured to allow for folding of said stroller frame.

8. The stroller as claimed in claim 1, further comprising a stroller seat disposed removably on said stroller frame.

9. A stroller comprising:
a stroller frame including two symmetrical side frames;
two first connecting devices disposed removably and respectively on said side frames of said stroller frame; and
a removable seat including a seat body and two second connecting devices respectively disposed on two sides of said seat body and releasably and respectively locked on said first connecting devices;
wherein each of said first connecting devices includes a connecting member disposed on a corresponding one of said side frames of said stroller frame, and a retaining member connected to said connecting member, said retaining member being convertible relative to said connecting member between a used state and an unused state, said retaining member in said used state being connected with said second connecting devices.

10. The stroller as claimed in claim 9, wherein each of said side frames of said stroller frame includes a mounting seat having a first connecting portion, and said connecting member of each of said first connecting devices has a second connecting portion connected slidably and removably to said first connecting portion of said mounting seat of a corresponding one of said side frames of said stroller frame.

11. A stroller comprising:
a stroller frame including two symmetrical side frames;
two first connecting devices disposed removably and respectively on said side frames of said stroller frame; and
a removable seat including a seat body and two second connecting devices respectively disposed on two sides of said seat body and releasably and respectively locked on said first connecting devices;
wherein each of said first connecting devices includes a connecting member disposed on a corresponding one of said side frames of said stroller frame, and a retaining member connected to said connecting member, said retaining member being convertible relative to said connecting member between a used state and an unused state, said retaining member in said used state being connected with said second connecting devices; and
wherein said connecting member and said retaining member are connected pivotally to each other so that said retaining member is pivotal relative to said connecting member to be convertible between said used and unused states.

12. A stroller comprising:
a stroller frame including two symmetrical side frames;
two first connecting devices disposed removably and respectively on said side frames of said stroller frame; and
a removable seat including a seat body and two second connecting devices respectively disposed on two sides of said seat body and releasably and respectively locked on said first connecting devices;
wherein each of said first connecting devices includes a connecting member disposed on a corresponding one of said side frames of said stroller frame, and a retaining member connected to said connecting member, each of said second connecting devices including a sleeve member and a locking member connected to said sleeve member, said sleeve member being sleeved on said retaining member, said locking member being operable for locking said second connecting devices to said first connecting devices.

13. The stroller as claimed in claim 10, wherein said mounting seat of each of said side frames of said stroller frame further has a pivot knuckle configured to allow for folding of said stroller frame.

14. The stroller as claimed in claim 9, further comprising a stroller seat disposed removably on said stroller frame.

15. A stroller comprising:
a stroller frame including two opposite side frames;
two supporting mechanisms disposed respectively on said two side frames of said stroller frame;
a first removable seat; and
a second removable seat;
wherein each of said supporting mechanisms is convertible between a first used state and a second used state before either one of said first and second removable seats is coupled to said stroller frame, so that said supporting mechanisms are selectively connected to one of said first and second removable seats to thereby mount a selected one of said first and second removable seats on said stroller frame;
wherein each of said supporting mechanisms includes a first connecting device disposed on a respective one of said side frames of said stroller frame, and a third connecting device connected removably to said first connecting device, when in said first used state, said third connecting device is separated from said first connecting device, so that said first removable seat can connect with said first connecting device so as to be supported on said stroller frame, when in said second used state, said third connecting device is connected to said first connecting device, so that said second removable seat can connect with said third connecting device so as to be supported on said stroller frame.

16. The stroller as claimed in claim 15, wherein said first connecting devices of said supporting mechanisms are removably and respectively connected to said side frames of said stroller frame.

17. The stroller as claimed in claim 15, wherein said first removable seat includes a seat body, and two second connecting devices disposed respectively on two sides of said seat body, said first connecting device of each of said supporting mechanisms including a connecting member disposed on a corresponding one of said side frames of said stroller frame, and a retaining member connected to said connecting member, said retaining member being convertible relative to said connecting member between a used state and an unused state, said retaining member in said used state projecting upwardly to selectively connect with one of said second connecting devices and said third connecting devices.

18. The stroller as claimed in claim 17, wherein said connecting member and said retaining member are connected pivotally to each other so that said retaining member is pivotal relative to said connecting member to be convertible between said used and unused states.

19. The stroller as claimed in claim 16, wherein each of said side frames of said stroller frame includes a mounting seat having a pivot knuckle configured to allow for folding of said stroller frame, said first connecting device of each of said supporting mechanisms being removably connected to said mounting seat.

20. The stroller as claimed in claim 9, wherein said first connecting devices are removably and respectively connected to said side frames of said stroller frame.

21. The stroller as claimed in claim 15, wherein each of said supporting mechanisms includes a first connecting device disposed on a respective one of said side frames of said stroller frame, and a third connecting device connected removably to said first connecting device, when in said first used state, said third connecting device is separated from said first connecting device, so that said first removable seat can connect with said first connecting device so as to be supported on said stroller frame, when in said second used state, said third connecting device is connected to said first connecting device, so that said second removable seat can connect with said third connecting device so as to be supported on said stroller frame.

* * * * *